(12) United States Patent
Modrzejewski

(10) Patent No.: US 11,459,949 B2
(45) Date of Patent: Oct. 4, 2022

(54) VARIABLE SEAL FOR AN ENGINE NACELLE

(71) Applicant: Lockheed Martin Corporation, Bethesda, MD (US)

(72) Inventor: Brian Stanley Modrzejewski, Keller, TX (US)

(73) Assignee: Lockheed Martin Corporation, Bethesda, MD (US)

(*) Notice: Subject to any disclaimer, the term of this patent is extended or adjusted under 35 U.S.C. 154(b) by 177 days.

(21) Appl. No.: 16/748,331

(22) Filed: Jan. 21, 2020

(65) Prior Publication Data

US 2021/0222620 A1 Jul. 22, 2021

(51) Int. Cl.
*F02C 7/042* (2006.01)
*B64D 29/00* (2006.01)

(52) U.S. Cl.
CPC .............. *F02C 7/042* (2013.01); *B64D 29/00* (2013.01); *F05D 2220/323* (2013.01); *F05D 2240/55* (2013.01); *F05D 2270/303* (2013.01); *F05D 2270/3015* (2013.01); *F05D 2270/311* (2013.01); *F05D 2270/313* (2013.01)

(58) Field of Classification Search
CPC ........ B64D 29/00; B64D 29/02; B64D 29/04; B64D 29/08; B64D 33/02; F02C 7/04; F02C 7/042; F05D 2260/608
See application file for complete search history.

(56) References Cited

U.S. PATENT DOCUMENTS

| 4,582,330 | A | 4/1986 | Lew |
| 7,506,839 | B2 | 3/2009 | Conner |
| 9,435,266 | B2 | 9/2016 | Sutterfield |
| 9,512,735 | B2 | 12/2016 | Davis |
| 9,932,844 | B2 | 4/2018 | Sutterfield et al. |
| 10,077,669 | B2 | 9/2018 | Bifulco |
| 2018/0283276 | A1* | 10/2018 | Todorovic .............. B64D 33/02 |
| 2019/0093492 | A1 | 3/2019 | Bifulco |
| 2019/0323429 | A1 | 10/2019 | McGee et al. |

\* cited by examiner

*Primary Examiner* — Scott J Walthour
(74) *Attorney, Agent, or Firm* — Baker Botts L.L.P.

(57) ABSTRACT

In one embodiment, an apparatus includes a first seal and a perforated cover. The first seal may comprise one or more inlet apertures and be located proximate to an opening into an interior of a nacelle. The perforated cover may be slidably engaged with the first seal and configured to vary an amount of air allowed into the interior of the nacelle.

20 Claims, 8 Drawing Sheets

Section 1C-1C

Section 1E-1E

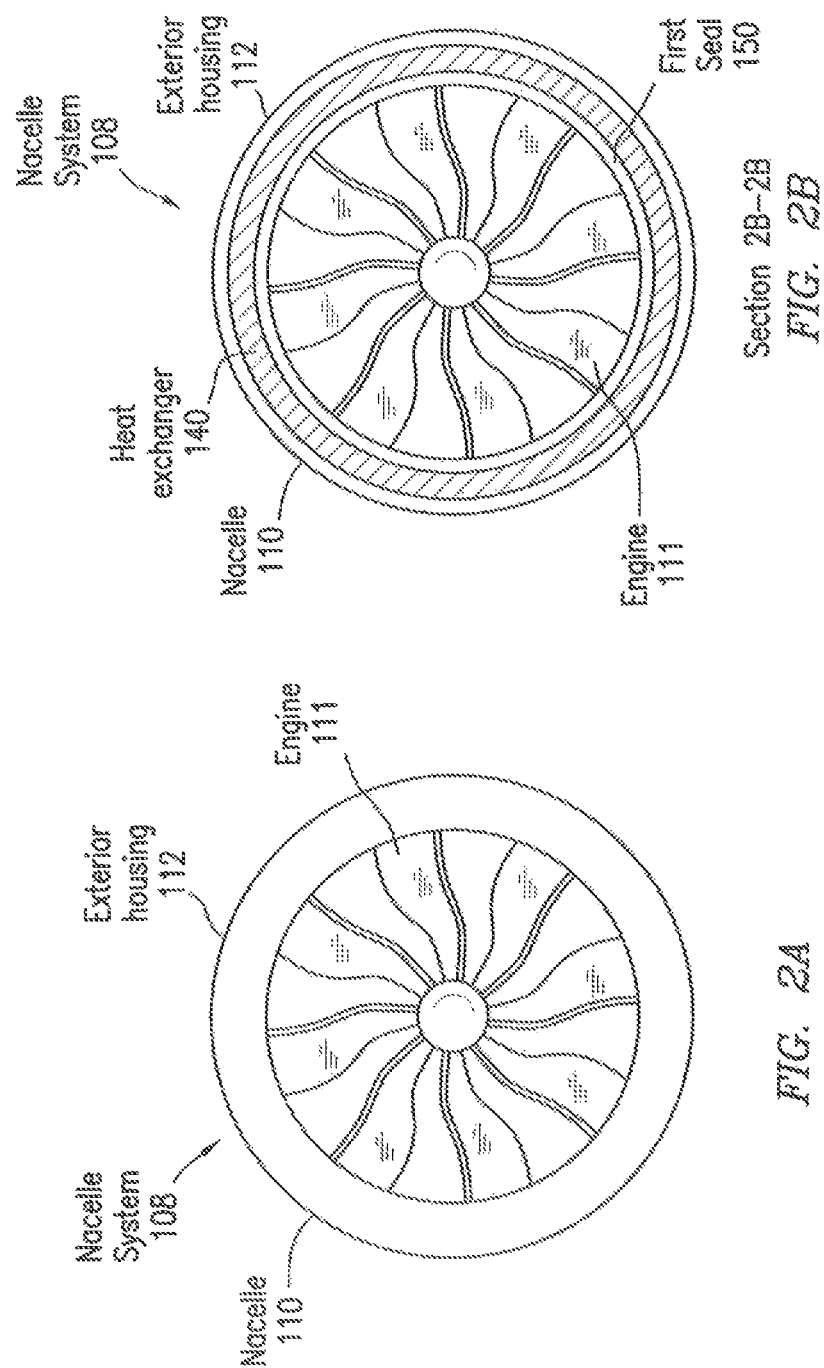

Section 3B-3B

Section 3B-3B

VARIABLE SEAL FOR AN ENGINE NACELLE

TECHNICAL FIELD

This disclosure relates in general to engine nacelles, and more particularly to a variable seal for an engine nacelle.

BACKGROUND

Aerial vehicles may generate heat through operation of on-board systems, such as engines, communications systems, or electronics control systems. As aerial vehicles are modernized, the amount of heat generated by the aerial vehicle may increase. This increased heat load may require additional heat dissipation to maintain the aerial vehicle within operating range.

SUMMARY OF THE DISCLOSURE

According to one embodiment, a system includes a nacelle, a first seal, and a perforated cover. The nacelle may comprise an exterior housing configured to at least partially surround an engine and a front portion proximate to a front face of the engine. The front portion of the nacelle may include an opening into an interior of the nacelle. The first seal may comprise one or more inlet apertures configured to allow air to a heat exchanger. The first seal may be located proximate to the opening of the nacelle. The perforated cover may be slidably engaged with the first seal and configured to vary an amount of air allowed into the interior of the nacelle.

According to one embodiment, an apparatus includes a first seal and a perforated cover. The first seal may comprise one or more inlet apertures and be located proximate to an opening into the interior of a nacelle. The perforated cover may be slidably engaged with the first seal and configured to vary an amount of air allowed into the interior of a nacelle.

According to one embodiment, a method includes monitoring an actual position of a perforated cover. The perforated cover may be slidably engaged with a first seal and configured to vary an amount of air allowed into the interior of a nacelle. The method may further include determining an overlap between one or more perforations in the perforated cover and one or more inlet apertures in the first seal. The method may also include determining a new position of a perforated cover. The new position may define a new overlap between the one or more perforations and the one or more inlet apertures.

Technical advantages of certain embodiments may include improved control over air flow to the interior of a nacelle. By varying the amount of air within a nacelle, heat exchange between aerial vehicle components and the ventilating air may be controlled. The amount of air flow may be varied according to the heat dissipation needs of an aerial vehicle or environmental conditions, and air flow may be controlled manually or automatically. Air flow may be controlled with greater precision and accuracy. Certain embodiments may permit control over air flow in environments in which air flow was not controlled previously (e.g., low-speed taxiing or high-speed flight).

Certain embodiments may increase reliability of control over air flow, reduce stress and wear in seal materials, and improve the lifetime of the seal. Certain embodiments may reduce seal weight, reduce friction between mechanical components, and provide for easier maintenance of the seal and nacelle. In addition, certain embodiments may improve operation of a variable seal in particular environments (e.g., icy or dusty conditions).

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 2A is a diagram that illustrates a front view of the example nacelle system of FIG. 1B, according to certain embodiments;

FIG. 2B is a diagram that illustrates a section view along lines 2B-2B of the example nacelle system of FIG. 1B, according to certain embodiments;

DETAILED DESCRIPTION OF THE DISCLOSURE

Figure 1A:
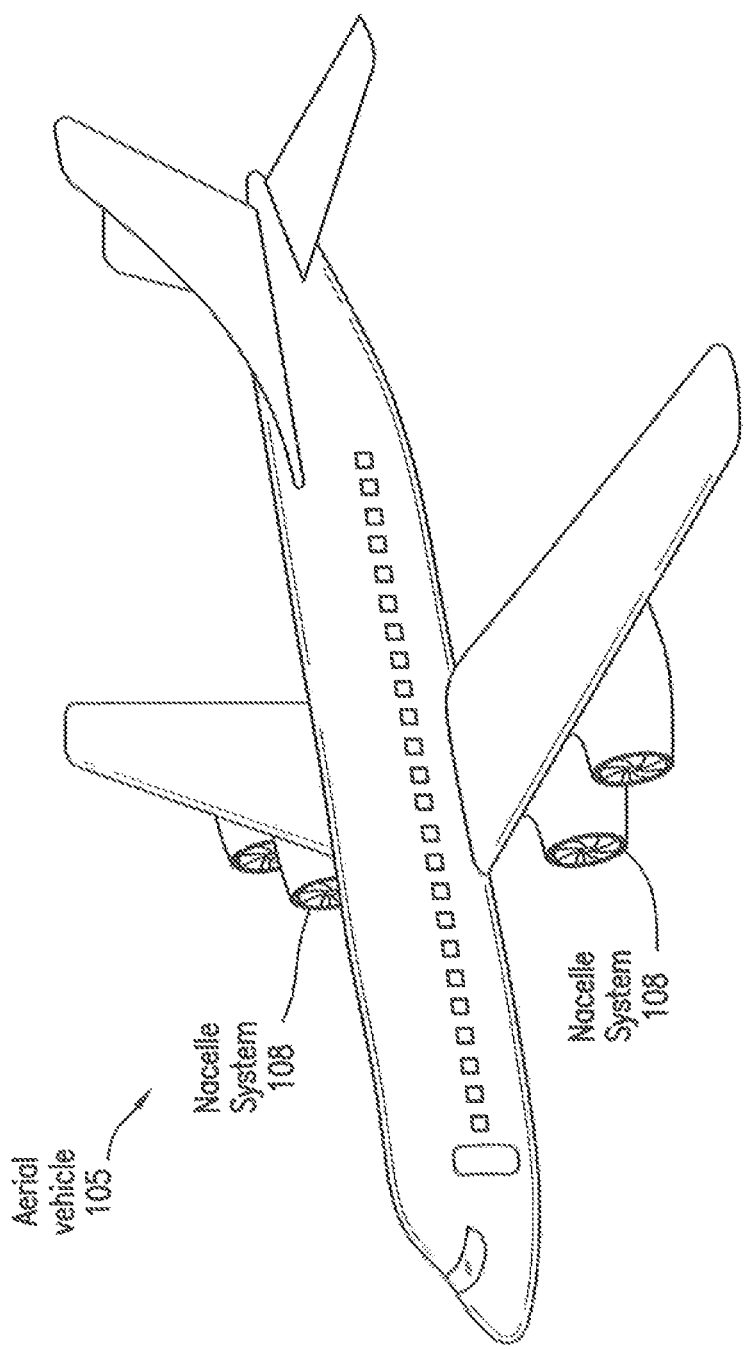
FIG. 1A is a diagram that illustrates a perspective view of an example aerial vehicle including one or more nacelle systems, according to certain embodiments.

Heat dissipation for aerial vehicles presents a growing problem, as more systems in the aerial vehicle are generating larger amounts of heat. For example, more sophisticated electrical, communications, or control systems require additional heat dissipation, and in some cases, require active cooling. Techniques to enhance heat dissipation within an aerial vehicle may allow air into the aerial vehicle and through a heat exchanger. The amount of heat dissipated depends on the amount of air allowed into the aerial vehicle. The amount of air allowed into the aerial vehicle may also affect other aerial vehicle performance parameters (e.g., thrust, drag). Environmental conditions, aerial vehicle performance, and the heat dissipation needs of the aerial vehicle, however, may warrant varying the amount of air allowed into the aerial vehicle.

Aspects of the present disclosure include a system that, in one embodiment, includes a nacelle, a first seal, and a perforated cover. The nacelle may comprise an exterior housing configured to at least partially surround an engine and a front portion proximate to a front face of the engine. The front portion of the nacelle may include an opening into an interior of the nacelle. The first seal may comprise one or more inlet apertures configured to allow air to a heat exchanger. The first seal may be located proximate to the opening of the nacelle. The perforated cover may be slidably engaged with the first seal and configured to vary an amount of air allowed into the interior of the nacelle.

The present disclosure may provide numerous advantages. For example, configuration of the seal may enable control over the amount of air entering a nacelle. Air flow may thus be tailored with greater precision and reliability to the needs of an aerial vehicle, systems on the aerial vehicle, or environmental conditions. Air flow may be controlled manually or automatically, providing improved heat dissipation while also allowing intervention from a user responsive to environmental conditions. Additionally, air flow may be controlled in situations where it could not be controlled previously. For example, air flow may be permitted into a nacelle when an aerial vehicle is taxiing at low speed, providing heat dissipation to active systems. As another example, air flow may be blocked in certain environments, such as dusty or icy conditions. Additional advantages may relate to operation and maintenance of the seal that controls airflow. Control over air flow may be implemented in a manner that reduces seal weight, reduces wear in seal materials, reduces part count, provides for easy maintenance of the seal, or simplifies control of seal operation. For example, the seal may control air flow reliably while shielded from the environment. As another example, the seal may receive signals controlling its configuration, minimizing the need for additional actuation devices. Other technical advantages will be readily apparent to one skilled in the art from the following figures, descriptions, and claims. Moreover, while specific advantages have been enumerated above, various embodiments may include all, some, or none of the enumerated advantages.

Figure 1B:
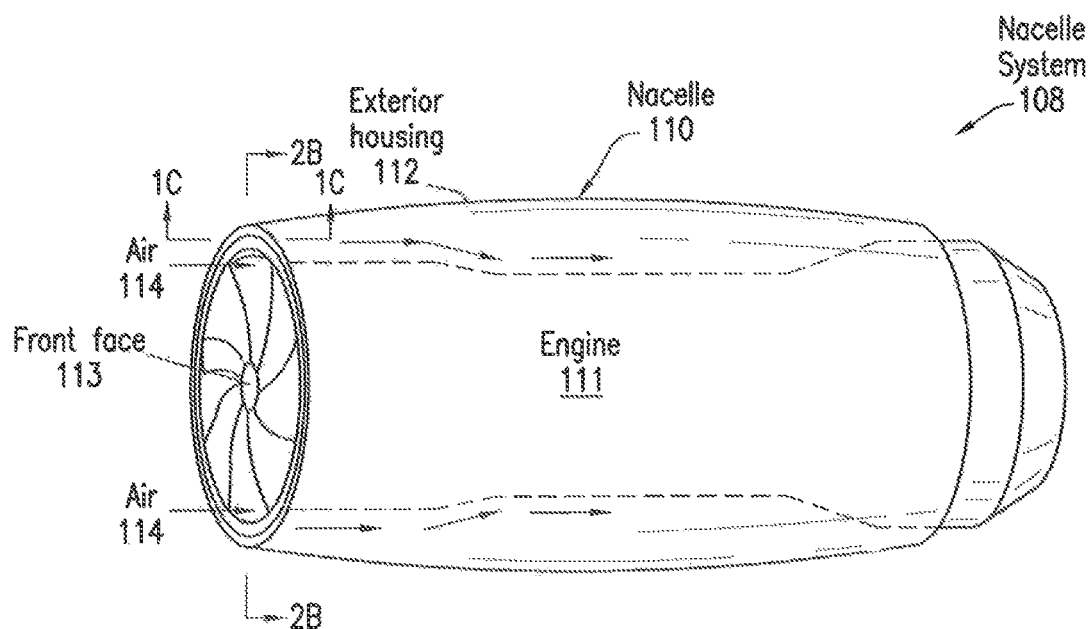
FIG. 1B is a diagram that illustrates a perspective view of an example nacelle system, according to certain embodiments.
Figure 1C:
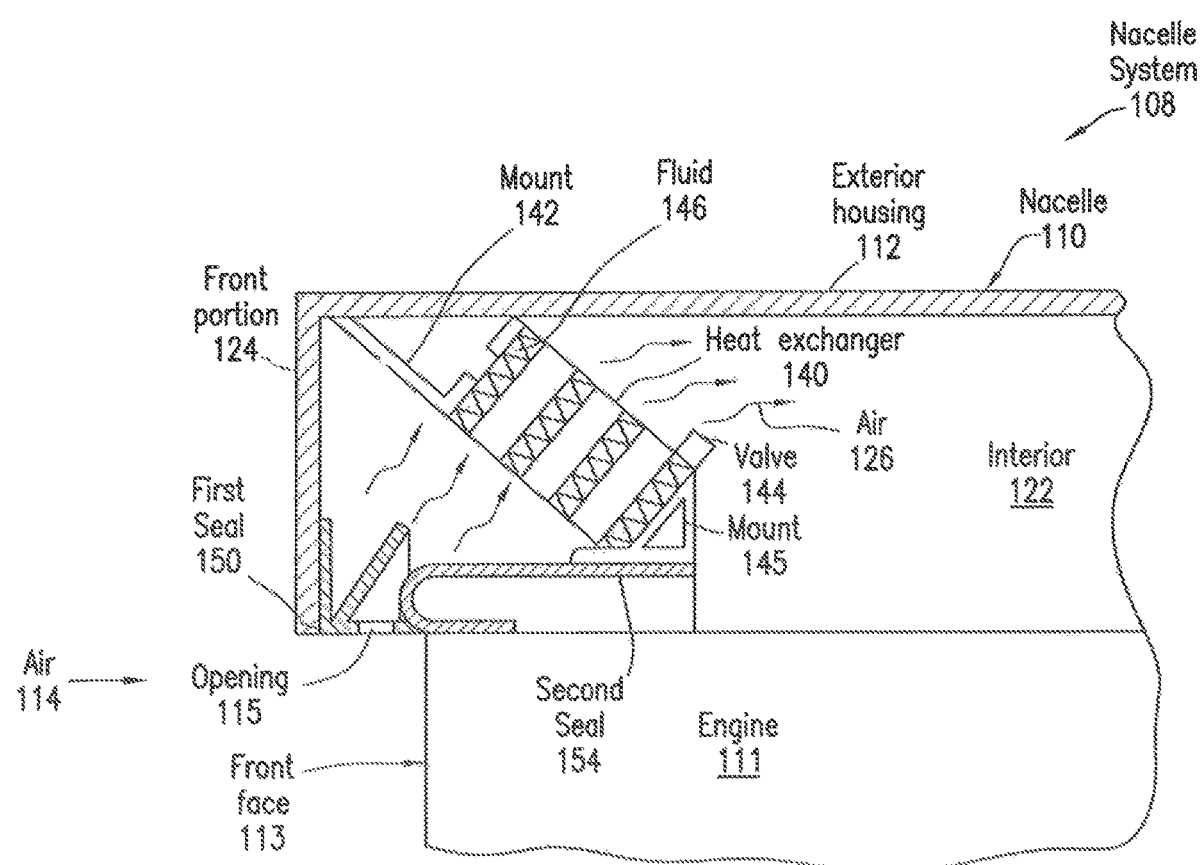
FIG. 1C is a diagram that illustrates a section view along lines 1C-1C of the example nacelle system of FIG. 1B, according to certain embodiments.
Figure 1D:
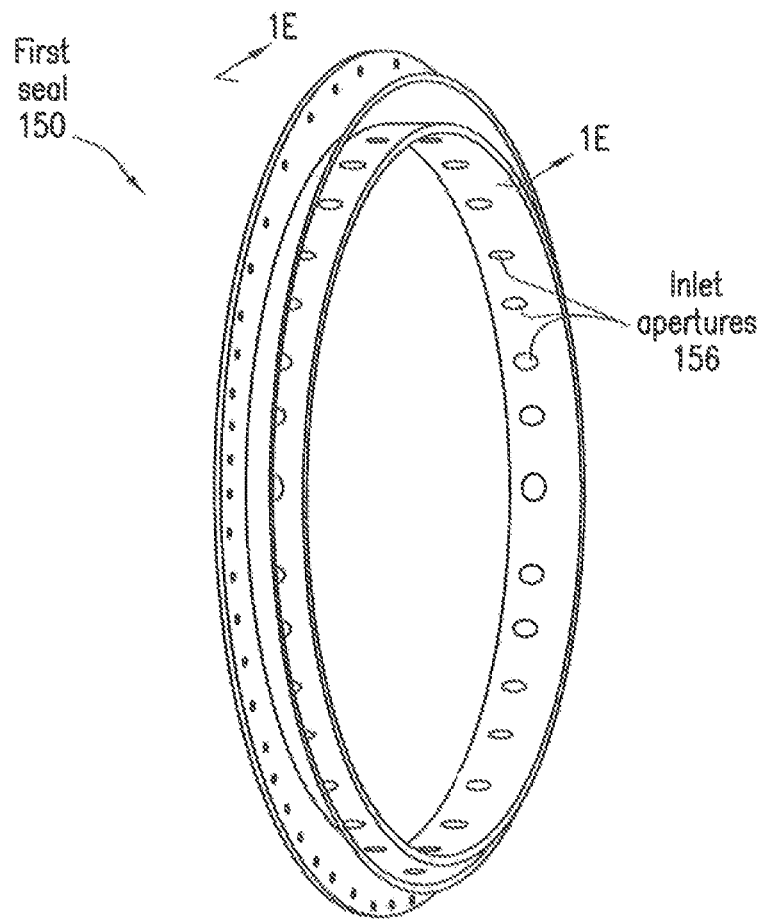
FIG. 1D is a diagram that illustrates a perspective view of an example first seal used with the example nacelle system of FIG. 1B, according to certain embodiments.
Figure 1E:
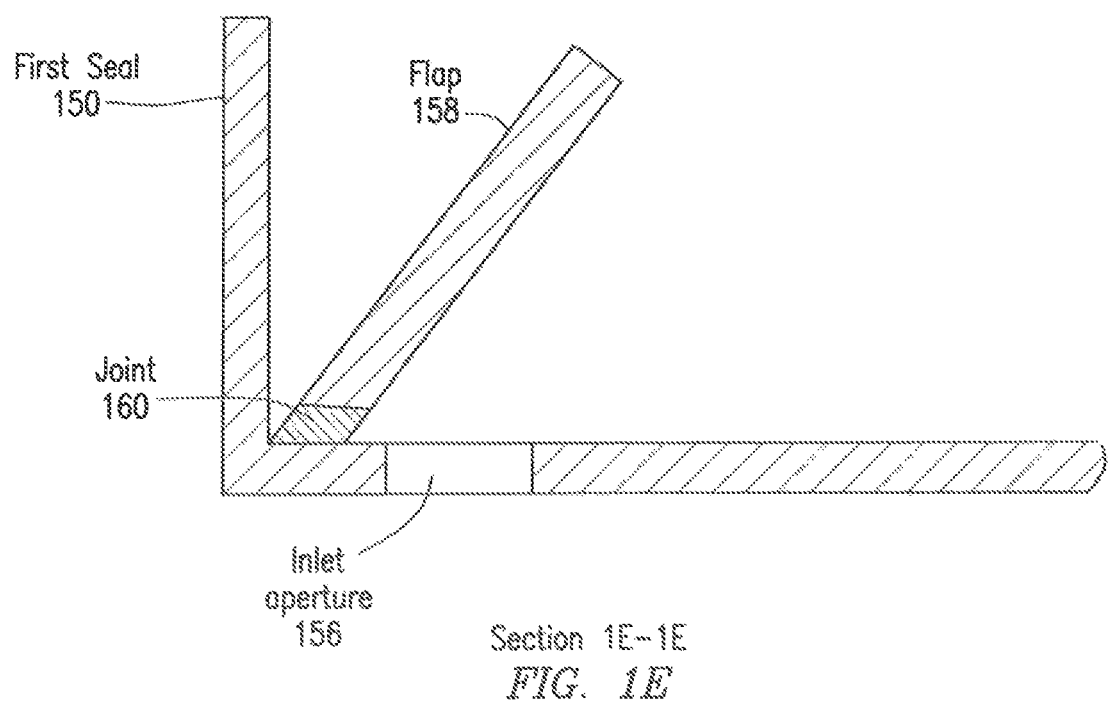
FIG. 1E is a diagram that illustrates a section view along lines 1E-1E of the example first seal of FIG. 1D, according to certain embodiments.
Figure 3A:
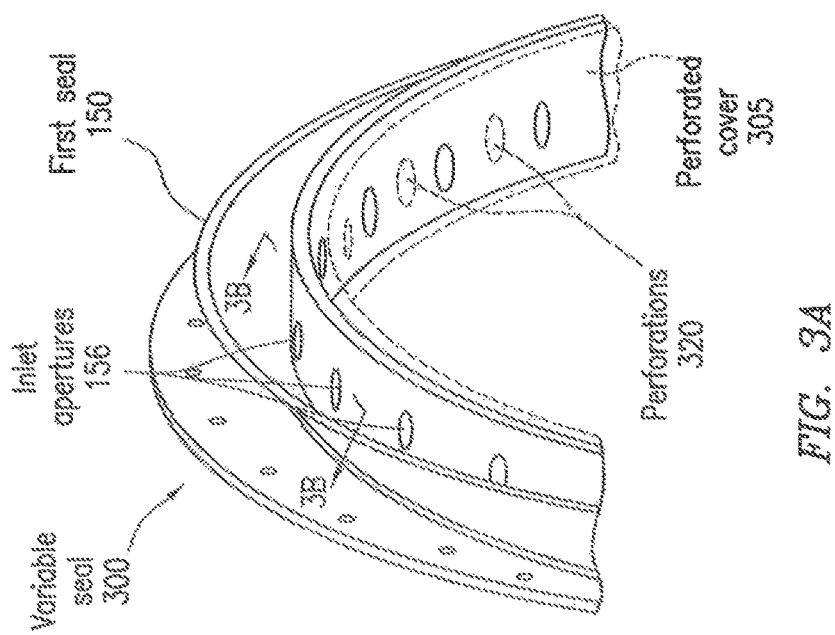
FIG. 3A is a diagram that illustrates a perspective view of a portion of an example variable seal of a first type, according to certain embodiments.
Figure 3B:
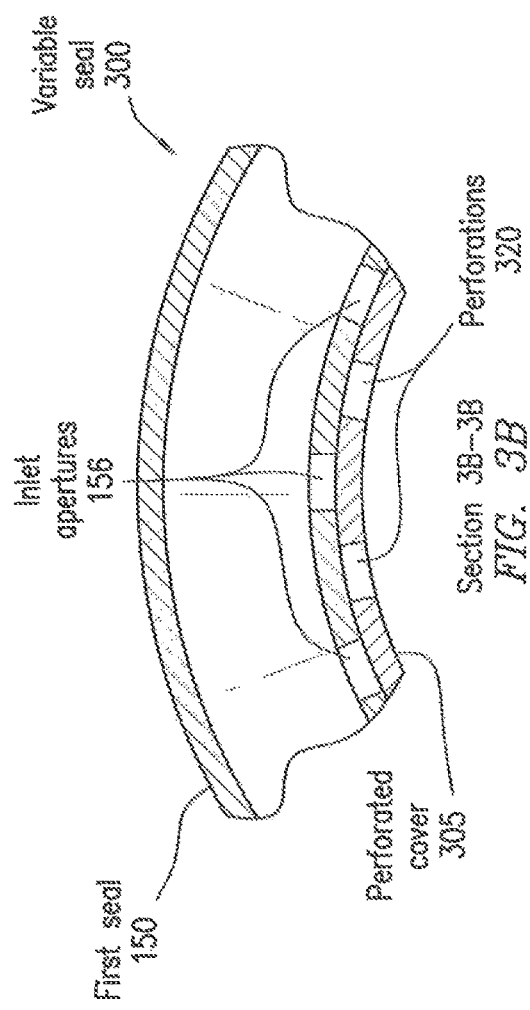
FIG. 3B is a diagram that illustrates a section view along lines 3B-3B of a portion of the example variable seal of FIG. 3A in a first position, according to certain embodiments.
Figure 3C:
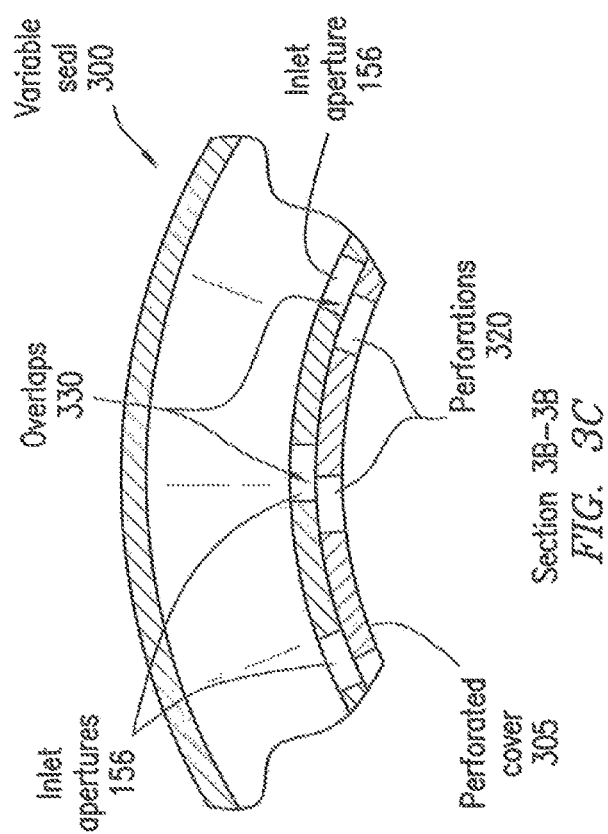
FIG. 3C is a diagram that illustrates a section view along lines 3B-3B of a portion of the example variable seal of FIG. 3A in a second position, according to certain embodiments.
Figure 4B:
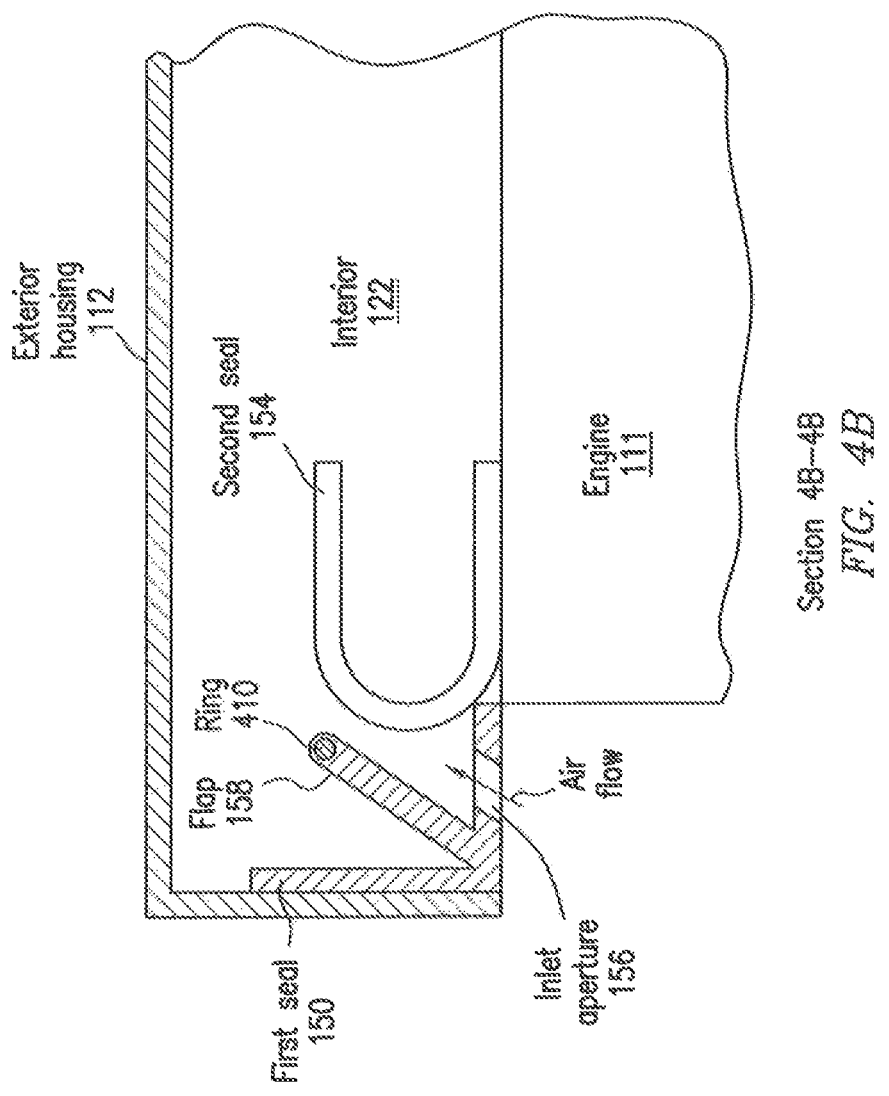
FIG. 4B is a diagram that illustrates a section view along lines 4B-4B of the example variable seal of FIG. 4A, according to certain embodiments.
Figure 4A:
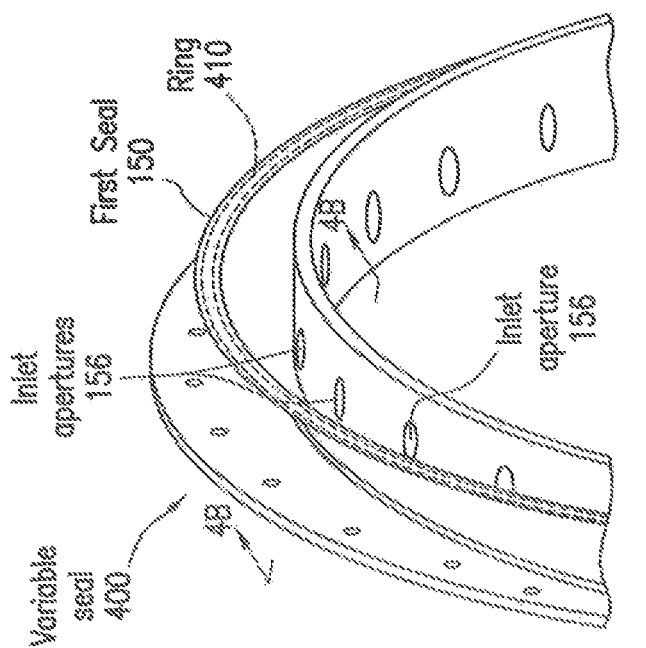
FIG. 4A is a diagram that illustrates a perspective view of a portion of an example variable seal of a second type, according to certain embodiments.
Figure 5:
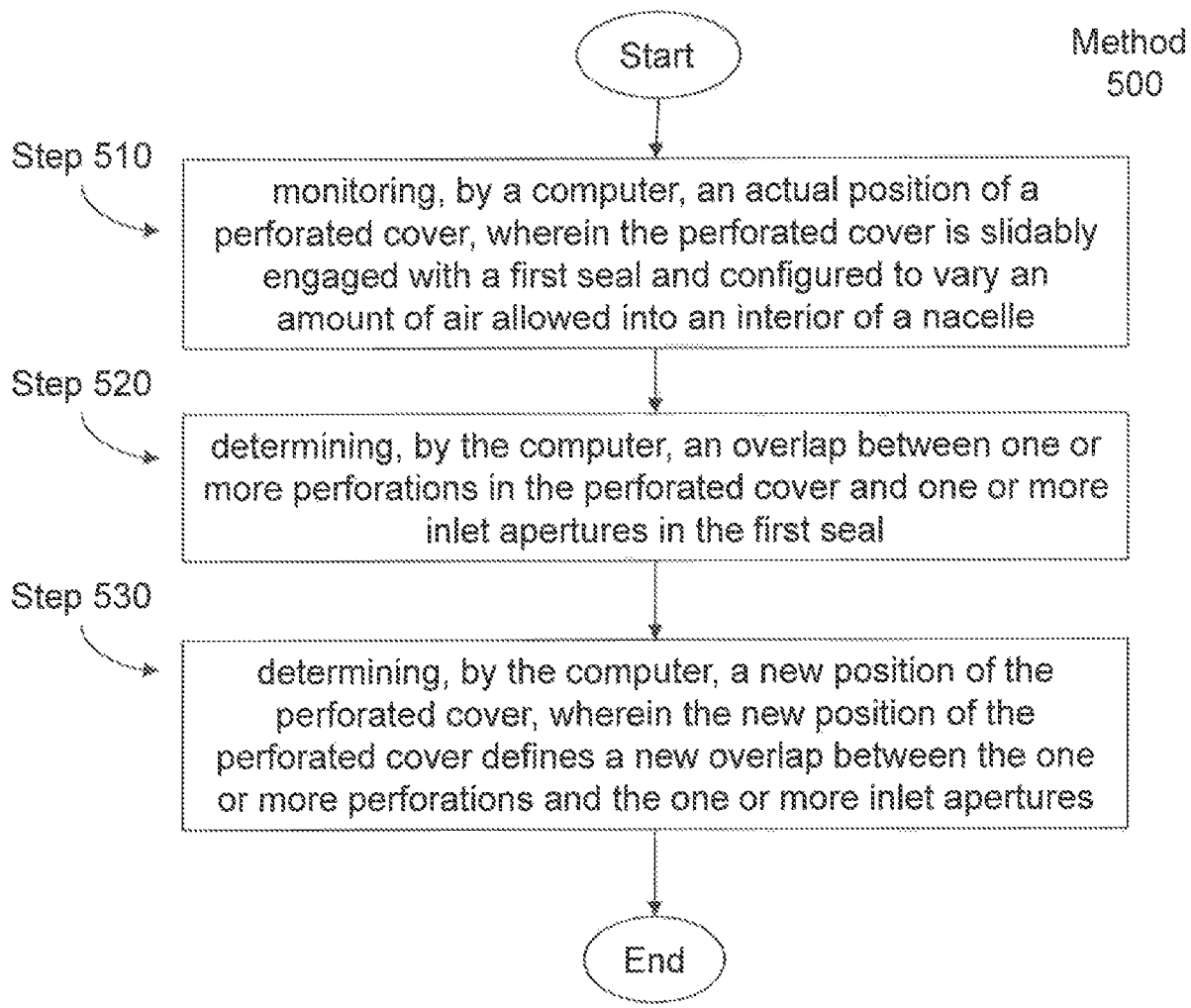
FIG. 5 is a flow chart illustrating an example method for varying air flow, according to certain embodiments.
Figure 6:
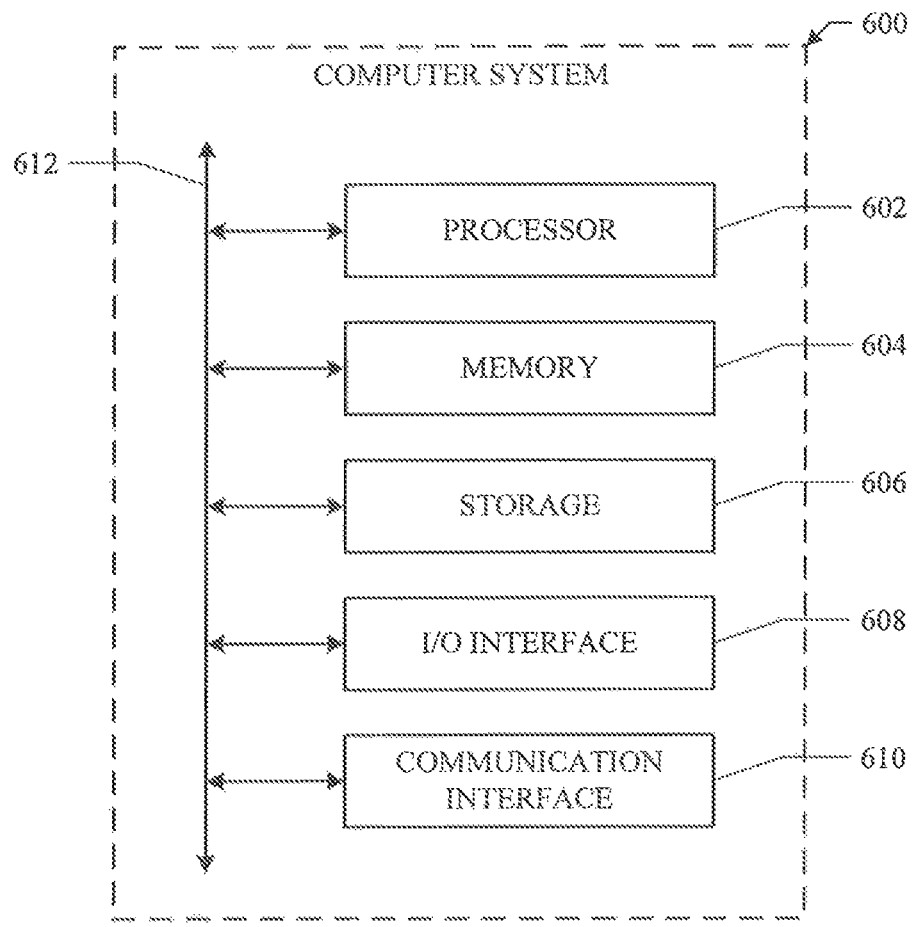
FIG. 6 is a schematic diagram illustrating an example computer system, according to certain embodiments.

To facilitate a better understanding of the present disclosure, the following examples of certain embodiments are given. The following examples are not to be read to limit or define the scope of the disclosure. Embodiments of the present disclosure and its advantages are described with reference to FIGS. 1 through 6. FIG. 1A illustrates aircraft 105 and nacelle system 108, and FIG. 1B illustrates additional details of nacelle system 108. FIG. 1C illustrates a section view along lines 1C-1C of a portion of nacelle system 108. FIGS. 1D and 1E respectively illustrate a perspective and section view along lines 1E-1E of a first seal 150 used with nacelle system 108. FIGS. 2A and 2B respectively illustrate a front and section view along lines 2B-2B of nacelle system 108. FIG. 3A illustrates a variable seal 300, and FIGS. 3B-3C illustrate section views of variable seal 300 in two different positions. FIGS. 4A-4B illustrate a perspective and section view along lines 4B-4B of variable seal 400. FIG. 5 is a flow chart illustrating an example method, and FIG. 6 is a schematic diagram illustrating an example computer system.

FIG. 1A is a diagram that illustrates a perspective view of an example aerial vehicle 105 including one or more nacelle systems 108, according to certain embodiments. Aerial vehicle 105 may be any type of manned or unmanned aerial vehicle, such as an airplane, a spacecraft, or a drone. Aerial vehicle 105 may include one or more nacelle systems 108. For instance, aerial vehicle 105 may include one or more nacelle systems 108 under each wing of aerial vehicle 105.

Nacelle system 108 may each be a nacelle and an engine in an embodiment. For example, nacelle system 108 may be a nacelle and an engine housed within the nacelle. Nacelle system 108 may be coupled to aerial vehicle 105 in any manner. Nacelle system 108 may be positioned on aerial vehicle 105 in a variety of locations. For instance, nacelle system 108 may be positioned under a wing of aerial vehicle 105. Nacelle system 108 may also include additional components discussed below.

FIG. 1B is a diagram that illustrates a perspective view of example nacelle system 108, according to certain embodiments. Nacelle system 108 may include a nacelle 110, an exterior housing 112, an engine 111, and a front face 113. Air 114 may flow into front face 113 of nacelle system 108.

Nacelle 110 may be a housing for one or more components of aerial vehicle 105 in certain embodiments. For example, nacelle 110 may be a housing for engine 111 of aerial vehicle 105. Nacelle 110 may be coupled to aerial vehicle 105. For example, nacelle 110 may be attached to a wing of aerial vehicle 105, such as underneath the wing. Nacelle 110 may at least partially surround engine 111. Nacelle 110 may surround engine 111 in its entirety in certain embodiments. Nacelle 110 may be disposed over at least a portion of the length of engine 111. In certain embodiments, the front of nacelle 110 may extend over front face 113 of engine 111. These configurations may allow excess air to be captured within nacelle 110 for ventilation and any other use within nacelle 110. For example, nacelle 110 may have an opening proximate to the perimeter of the engine that allows air within nacelle 110. In certain embodiments, nacelle 110 includes exterior housing 112.

Exterior housing 112 may be a part of nacelle 110. For instance, exterior housing 112 may be an outside portion of nacelle 110. Exterior housing 112 may be made of any suitable material. Exterior housing 112 may be any suitable shape. The shape and material of exterior housing 112, for example, may be based on weight of exterior housing 112, aerodynamic properties of exterior housing 112, or the shape of engine 111. Exterior housing 112 may be disposed over at least a portion of the length of engine 111.

Engine 111 may be any type of engine. In certain embodiments, engine 111 may be any suitable combustion engine. For example, engine 111 may be a jet propulsion engine or any other airbreathing engine. In general, engine 111 intakes air 114 through front face 113 and uses air 114 during its combustion reaction to produce thrust. In certain embodiments, thrust may be generated by accelerating a jet of fluid in the direction opposite front face 113. Engine 111 may also use air 114 flowing through its intake to passively cool engine 111 or ventilate engine 111 and surrounding environment. Engine 111 may include front face 113.

Front face 113 may be a front portion or face of engine 111 in an embodiment. Front face 113 of engine 111 may be the area or portion of engine 111 that first receives incident air flow. In certain embodiments, nacelle 110 leaves front face 113 at least partially exposed. Front face 113 may be configured to vary the amount of air flowing into engine 111.

Air 114 may be air flowing at, towards, into, or incident to all or a portion of nacelle system 108 in an embodiment. For example, air 114 may be air incident to front face 113. Air 114 flowing into nacelle system 108 may facilitate operation of engine 111. For example, engine 111 may intake air 114 and use it in a combustion reaction to produce thrust. Some of air 114 may flow outside of engine 111. For example, some of air 114 may flow into or around nacelle 110. In some embodiments, the amount of air 114 flowing towards engine 111 exceeds the engine's 111 intake capacity. In such cases, the excess air flow may spill over and flow over the outside of nacelle 110, thereby causing drag to nacelle 110. The incident air 114 may flow radially away from the center of engine 111 and over the length of nacelle 110. In some embodiments, the amount of air 114 flowing towards engine 111 may not be enough to generate the needed thrust for engine 111. In certain embodiments, some of air 114 may flow into opening 115 (discussed below) between engine 111 and nacelle 110. For example, the excess air 114 may ventilate the environment around engine 111 within nacelle 110. This ventilation may remove volatiles or any undesired matter away from engine 111.

FIG. 1C is a diagram that illustrates a section view along lines 1C-1C of the example nacelle system 108 of FIG. 1B, according to certain embodiments. FIG. 1C illustrates additional components of nacelle system 108 not shown in FIG. 1B, including an opening 115, an interior 122, a front portion 124, a heat exchanger 140, mounts 142 and 145, a valve 144, a fluid 146, a first seal 150, and a second seal 154. In general, air 114 may flow incident to front face 113 and into nacelle 110 via opening 115.

Opening 115 may be a hole, a gap, a passageway, a port, an inlet, or any other type of opening between nacelle 110 and engine 111. For example, opening 115 may be an inlet in front portion 124. Opening 115 may allow air 114 to flow into nacelle 110 in an embodiment. For example, some of air 114 incident to front face 113 may flow through opening 115 and into nacelle 110 in an embodiment. In an embodiment, opening 115 may be positioned proximate to front face 113 of engine 111. Opening 115 may be positioned on an axis that intersects an axis of front portion 124, such as an axis that is perpendicular to front portion 124.

Interior 122 may be an interior portion of nacelle 110. For example, interior 122 may be contained within exterior housing 112 of nacelle 110. The size and shape of interior 122 may be determined based on the size and shape of exterior housing 112, the size and shape of engine 111, and the aerodynamic properties of nacelle 110. Air 114 flowing through opening 115 may flow into interior 122 of nacelle 110. Interior 122 may contain any components inside nacelle 110 needed for operation of nacelle 110, engine 111, or aerial vehicle 105. For example, interior 122 may contain heat exchanger 140 (discussed below) for dissipating heat from engine 111 or other components in aerial vehicle 105. Interior 122 may contain any suitable material or combination of materials. For example, interior 122 may include air 114 that flows into nacelle 110. As another example, interior 122 may contain a honeycomb structure that permits air flow within interior 122.

Front portion 124 may be a front portion of nacelle 110 in an embodiment. For example, front portion 124 may be a front portion of exterior housing 112 of nacelle 110 in an embodiment. In some embodiments, front portion 124 surrounds front face 113. In some embodiments, front portion 124 includes an opening 115 into interior 122 of nacelle 110. In some embodiments, front portion 124 may partially cover front face 113. In some embodiments, air 114 is incident on front portion 124 and front face 113. Front portion 124 may have an axis that is parallel or substantially parallel to an axis of front face 113. In certain embodiments, front portion 124 may be shaped based on aerodynamic properties of nacelle 110. Front portion 124 may be sized to fit components within interior 122 of nacelle 110. Front portion 124 may be positioned proximate to front face 113 of engine 111 in an embodiment. Front portion 124 may be positioned adjacent to first seal 150 in an embodiment.

Air 126 may be air in interior 122 of nacelle 110. For instance, air 126 may be a portion of air 114 that entered into opening 115. Air 126 may be air that has passed through heat exchanger 140. For example, air 126 may be air that has been warmed or cooled by heat exchanger 140. Air 126 may be used to dissipate heat from any part of aerial vehicle 105.

Heat exchanger 140 may be any suitable structure for exchanging heat between two or more heat exchanging mediums. For example, heat exchanger 140 may be configured to exchange heat between fluid 146 flowing within heat exchanger 140 and air 126 in interior 122 of nacelle 110. Heat exchanger 140 may be disposed within interior 122 of nacelle 110. Heat exchanger 140 may facilitate the exchange or transfer of heat to or from the environment of interior 122 of nacelle 110. For example, heat exchanger 140 may facilitate the transfer of heat from heat exchanger 140 to air 126 within interior 122 of nacelle 110. Air 126 within interior 122 may be at a lower temperature than heat exchanger 140, and heat exchanger 140 may passively transfer heat to air 126 within nacelle 110. In some embodiments, air 126 may pass through a portion of heat exchanger 140. The amount of flow of air 126 may increase the amount of heat transferred by heat exchanger 140. For instance, first seal 150 may be selectively opened to allow additional air 114 from outside nacelle 110 to flow into interior 122 of nacelle 110 through heat exchanger 140. In this manner, first seal 150 may control the capacity of heat transfer by heat exchanger 140. Heat exchanger 140 may be configured to be located inside interior 122 of nacelle 110 in any suitable manner to allow air 126 to flow across a portion of heat exchanger 140. For example, heat exchanger 140 may be coupled to one or more of exterior housing 112 or engine 111 through mounts 142 or 145. In some embodiments, heat exchanger 140 may be coupled to both exterior housing 112 and engine 111. For example, heat exchanger 140 may be mounted directly to exterior housing 112 by mount 142 and coupled via a portion of second seal 154 to engine 111 using mount 145. In certain embodiments, heat exchanger 140 may include an intermediary heat exchanging medium to move heat from a remote system to or from heat exchanger 140 inside nacelle 110. For example, the heat exchanging medium may flow from heat exchanger 140 to another heat exchanging apparatus located at a remote system outside nacelle 110. For example, heat from mechanical systems, control systems, communications systems, or electronics systems may require additional heat dissipation. Accordingly, one or more of the remote systems may transfer heat to the heat exchanging medium, which may be used to transport the transferred heat to heat exchanger 140. At heat exchanger 140, the transported heat may be transferred to air 126 inside interior 122 of nacelle 110.

Mounts 142 and 145 may be any suitable structures for mounting heat exchanger 140 within nacelle 110. For example, mount 142 may mount heat exchanger 140 to exterior housing 112, and mount 145 may mount heat exchanger 140 to second seal 154 or engine 111. In certain embodiments, mount 142 may be integrated into exterior housing 112, and mount 145 may be integrated into second seal 154, or engine 111. Mounts 142 and 145 may be coupled to exterior housing 112, second seal 154, or engine 111 by any suitable means. For example, mounts 142 and 145 may be glued, welded, bolted, or otherwise coupled to exterior housing 112, second seal 154, or engine 111.

Valve 144 may be any component configured to control the passage of fluid 146. When valve 144 is open, heat exchanger 140 may be configured to eject fluid 146 used to transfer heat into interior 122 of nacelle 110. For example, fluid 146 experiences a certain pressure within heat exchanger 140. When valve 144 is open, the resulting pressure differential may cause fluid 146 to flow out of heat exchanger 140 through valve 144 and into interior 122 of nacelle 110. In embodiments where fluid 146 has fire extinguishing or fire-retardant properties, fluid 146 may be ejected into interior 122 of nacelle 110 in the event of a fire within nacelle 110. For example, valve 144 may be opened in response to detecting a fire at engine 111. The fire retardant/extinguishing fluid 146 may extinguish or help extinguish the detected fire and reduce the damage caused by the fire. For example, fluid 146 may be used in addition to existing techniques for extinguishing a fire at engine 111. Because heat exchanger 140 ejects fluid 146 inside nacelle 110, heat exchanger 140 may be best positioned to deliver an extinguishing fluid 146 to engine 111 or anywhere within nacelle 110. In this manner, heat exchanger 140 may also serve as a fire suppression system. Valve 144 may be a component of heat exchanger 140 in an embodiment. Valve 144 may be controllable to open or close, either automatically or manually.

Fluid 146 may be any fluid that can facilitate the transfer of heat. For example, fluid 146 may be a liquid, a gas, or a combination of liquid and gas. Fluid 146 may flow through heat exchanger 140 to facilitate the transfer of heat between fluid 146 and air 126. Heat exchanger 140 may allow for the transfer of heat between fluid 146 and environment in interior 122 of nacelle 110. Fluid 146 may be any suitable heat-exchanging fluid. For example, the fluid may be a Chlorofluorocarbon (CFC), a Hydrochlorofluorocarbon (HCFC), a Hydrofluorocarbon (HFC), a Fluorocarbon (FC), a Hydrocarbon (HC), Ammonia, Carbon Dioxide, a water, a polyalphaolefin (PAO), or a water-glycol mixture. In certain embodiments, fluid 146 may have fire-extinguishing or fire-retardant capabilities.

In an embodiment, first seal 150 may be a seal that selectively allows, prevents, controls, or varies the flow of air 114 into nacelle 110. For example, first seal 150 may be a K-seal. In an embodiment, a K-seal is a seal that includes one or more fingers or flaps, such as fingers or flaps that extend from another portion of the seal to form a shape similar to a "k." First seal 150 may include one or more inlet apertures 156 (discussed below) configured to allow air 114 into heat exchanger 140. In certain embodiments, first seal 150 may be proximate to opening 115 between nacelle 110 and engine 111. First seal 150 may be coupled to or positioned adjacent to front portion 124. In certain embodiments, first seal 150 may be coupled to, positioned adjacent to, or positioned proximate to engine 111. First seal 150 may include a flap that may move to open first seal 150 by moving the flap towards front portion 124 and may move to close first seal 150 by resting against a portion of second seal 154. In certain embodiments, first seal 150 may include a flap that rests against a portion of front portion 124 or engine 111. In an embodiment, first seal 150 is configured to allow air 114 into interior 122 of nacelle 110 when exposed to a pressure differential between air 114 outside nacelle 110 and air 126 inside nacelle 110. For example, first seal 150 may automatically open or close based on the pressure differential between the pressure outside nacelle 110 and the pressure inside interior 122 of nacelle 110. In some embodiments, the pressure differential may result from aerial vehicle 105 achieving a threshold speed during operation. In some embodiments, the pressure differential may result from the speed of forced air outside nacelle 110 proximate to front face 113 (e.g., air forced by a fan or compressor). In this manner, first seal 150 may open during operation of aerial vehicle 105 when it may most need heat dissipation facilitated by ambient air.

In certain embodiments, first seal 150 may comprise a mechanical seal. For example, first seal 150 may include one or more mechanical parts that are controlled through a controlling mechanism to selectively open and close first seal 150 by moving one or more of the mechanical parts. In some embodiments, the controlling mechanism may include any electrical control means, such as actuators, solenoids, switches, motors, etc. or hydraulic control means, or any combination thereof. The controlling mechanism may be automatically activated to selectively open or close first seal 150. For example, the controlling mechanism may selectively open or close first seal 150 in response to one or more environmental conditions or in response to one or more measured conditions of engine 111 or heat dissipation needs at a remote system. In some embodiments, the controlling mechanism may be operated manually, as an alternative or in addition to being automatically controlled, to selectively introduce air into interior 122 of nacelle 110. For example, a pilot of aerial vehicle 105 may manually open (e.g., through controls in the cockpit) first seal 150 to permit air flow within nacelle 110 while aerial vehicle 105 is taxiing at a low-speed.

First seal 150 may be made from any suitable material. As particular examples, first seal 150 may be made from elastomer, plastic (e.g. Teflon), or any other suitable material or any suitable combination of materials. First seal 150 may comprise one or more rheological materials. In certain embodiments, first seal 150 may be configured to open or close based on rheological properties. Rheological material in first seal 150 may be, for example, thermorheological, magnetorheological, or electrorheological. In some embodiments, a control signal may trigger a rheological deformation of first seal 150. For example, first seal 150 may comprise a magnetorheological material that causes first seal 150 to deform in response to a magnetic field. The control signal may be automatically activated to selectively open or close first seal 150. For example, the control signal may selectively open or close first seal 150 in response to one or more environmental conditions or in response to one or more measured conditions of engine 111 or heat dissipation needs at a remote system. In some embodiments, the control signal may be triggered manually, alternatively or in addition to being automatically controlled, to selectively introduce air 114 into interior 122 of nacelle 110.

First seal 150 may vary the amount of air 114 allowed into interior 122 of nacelle 110. In certain embodiments, first seal 150 may automatically allow air 114 to flow into interior 122 of nacelle 110 based on one or more environmental conditions at nacelle 110 or engine 111. In some embodiments, first seal 150 may automatically allow air 114 to flow through opening 115 when the pressure differential between air 114 outside nacelle 110 and air 126 in interior 122 of nacelle 110 is greater than a predetermined threshold. For example, a pressure differential may be created based on the speed of aerial vehicle 105 and above a certain speed, first seal 150 may open to allow air 114 to flow within interior 122 of nacelle 110.

In certain embodiments, first seal 150 may block, permit, or vary air 114 to flow into nacelle 110 in combination with another seal (e.g., second seal 154 discussed further below). In certain embodiments, first seal 150 alone may control the amount of air 114 entering nacelle 110. For example, first seal 150 may be placed across opening 115 (e.g., coupled to front portion 124 and engine 111) such that first seal 150 controls the amount of air 114 entering nacelle 110 without any other seal present.

First seal 150 may be configured to selectively open or close. In certain embodiments, first seal 150 may be configured to be closed, to open completely, or open partially from 0% open to 100% open. Whether first seal 150 is opened or closed may control the flow of air 114 into interior 122 of nacelle 110. For example, if first seal 150 is closed, no air 114 may flow into interior 122 of nacelle 110. As another example, if first seal 150 is open, then air 114 may flow into interior 122 of nacelle 110. As yet another example, if first seal 150 is only partially open, air 114 may still flow into interior 122 of nacelle 120, but at a lower flow rate than if first seal 150 were completely open. As such, the amount of air 114 flowing into interior 122 of nacelle 110 may depend on how open seal 150 is. In this manner, first seal 150 may vary the amount of air flow into nacelle 110.

In some embodiments, first seal 150 may vary the amount of air flow based on the heat dissipation requirements of aerial vehicle 105. For example, if additional heat is generated at engine 111 or at a remote system, first seal 150 may be opened to allow air 114 to flow into interior 122 of nacelle 110 to provide additional heat dissipation. In certain embodiments, first seal 150 may vary the amount of air 114 allowed into interior 122 based on the temperature of fluid 146. For example, nacelle 110 or remote systems may include one or more sensors with which to detect and measure the temperature of fluid 146 within heat exchanger 140. If a measured temperature is above a threshold temperature, first seal 150 may open to allow air 114 into interior 122 of nacelle 110. As a result, air 114 may be introduced into interior 122 when there is an unmet heat dissipation need, e.g., as indicated by the temperature of fluid 146. Other sensors or measurements may be used to control the flow of air 114 into interior 122 of nacelle 110. For example, one or more temperature or pressure sensors of fluid 146 within heat exchanger 140 or at remote locations may be used to determine whether heat dissipation using heat exchanger 140 is needed at an increased level. As another example, an anticipated heat load may be determined based on the operation of aerial vehicle 105, which may be used to control first seal 150 to allow air 114 into nacelle 110.

In certain embodiments, first seal 150 may block, permit, or vary air flow into interior 122 of nacelle 110 based on environmental conditions. Environmental conditions may include one or more of: a flight speed of aerial vehicle 105; a speed of air flow at front face 113 of engine 111; a temperature of air 126 in the interior 122 of nacelle 110; a temperature of nacelle 110; a temperature of air 114 outside of nacelle 110 proximate to opening 115; a temperature of fluid 146 flowing within heat exchanger 140; a temperature of one or more remote systems from which heat exchanger 140 is removing heat; a pressure differential between air 114 outside nacelle 110 at opening 115 and air 126 within the interior of nacelle 110; an amount of moisture in air 114 outside nacelle 110; an amount of moisture in air 126 inside nacelle 110; and an amount of dust in air 114 outside nacelle 110. For example, if an amount of dust in air 114 outside nacelle 110 exceeds a threshold amount, first seal 150 may be automatically closed to prevent the entry of dust into nacelle 110. Configuration of first seal 150 to vary the amount of air 114 entering nacelle 110 based on environmental conditions may be controlled manually, automatically, or with a combination of manual and automatic control. For example, if aerial vehicle 105 is flying at high speed in an icy environment, automatic controls may configure first seal 150 to open to increase heat dissipation. Manual input, however, could override the default configuration to prevent icing of critical systems.

In an embodiment, second seal 154 is a seal that may selectively allow, prevent, control, or vary the amount of air 114 flow into nacelle 110. For example, second seal 154 may include a J-seal. In an embodiment, a J-seal is a seal that includes a curved surface (e.g., a seal shaped like the letter "J"). In certain embodiments, second seal 154 may be proximate to opening 115 between nacelle 110 and engine 111. Second seal 154 may be coupled to, positioned adjacent to, or positioned proximate to engine 111. In certain embodiments, second seal 154 may be coupled to front portion 124. For example, second seal 154 may be a J-seal coupled to front portion 124, and first seal 150 may be a K-seal coupled to engine 111. In certain embodiments, second seal 154 may include a mechanical seal. For example, second seal 154 may include one or more mechanical parts that are controlled through a controlling mechanism to selectively open and close second seal 154 by moving one or more of the mechanical parts. Second seal 154 may be made of any suitable material or combination of materials. Second seal 154 may be made of materials or a combination of materials that is the same or different than the materials or combination of materials in first seal 150. For example, second seal 154 may be made of rheological material.

As an example embodiment of operation, air 114 may flow incident to front face 113 of engine 111 of nacelle system 108. If first seal 150 is at least partially open, then some of air 114 may flow through opening 115 into interior 122 of nacelle 110. If first seal 150 is not open, then air 114 may not flow through opening 115. First seal 150 and/or second seal 154 may be used to selectively vary the amount of air 114 allowed into interior 122 of nacelle 110. For any air 114 allowed into interior 122 of nacelle 110, air 114 may pass through heat exchanger 140, where heat may be dissipated.

FIG. 1D is a diagram that illustrates a perspective view of an example first seal 150 used with the example nacelle 110 of FIG. 1B, according to certain embodiments. As described above with reference to FIG. 1C, first seal 150 may vary the amount of air 114 allowed into interior 122 of nacelle 110. FIG. 1D illustrates first seal 150 including one or more inlet apertures 156.

Inlet apertures 156 may be one or more holes, openings, spaces, or any type of passages that allow air to pass through first seal 150 into interior 122 of nacelle 110. Inlet apertures 156 may have any suitable shape, size, and spacing. Inlet apertures 156 may be the same shape and size of perforations 320 (discussed below) in an embodiment. There may be one or more inlet apertures 156 on first seal 150. For instance, as shown in FIG. 1D, inlet apertures 156 may be evenly spaced around an interior circumference of first seal 150. Inlet apertures 156 may define the amount of air 126 flowing into interior 122 of nacelle 110 when first seal 150 is open. The size, shape, number, and spacing of inlet apertures 156 may control the amount of air 114 allowed into nacelle 110. In certain embodiments, not all inlet apertures 156 may have the same size or shape. For example, inlet apertures 156 may include both circular and rectangular apertures.

FIG. 1E is a diagram that illustrates a section view along lines 1E-1E of the example first seal 150 of FIG. 1D, according to certain embodiments. The section view in FIG. 1E illustrates additional parts of the example first seal 150 not described with reference to FIG. 1D, including flap 158 and joint 160.

Flap 158 may be a finger, flap, skirt, appendage, tab, or tag of first seal 150. Flap 158 may open first seal 150 by moving away from second seal 154 and may close first seal 150 by moving toward second seal 154. In certain embodiments, flap 158 may open first seal 150 by moving toward front portion 124 or engine 111 and may close first seal 150 by moving away from front portion 124 or engine 111. For example, second seal 154 may not be present, such that flap 158 rests on engine 111 or front portion 124 when first seal 150 is closed. In certain embodiments, flap 158 of first seal 150 may also comprise or be coupled to joint 160.

Joint 160 may be any material or structure (including, e.g., an elbow, pivot, joint, hinge, spring, knee, bearing, or swivel) suitable for decreasing or increasing the stiffness of flap 158 in a manner that facilitates or inhibits opening of first seal 150. Joint 160 may be located anywhere along the length of flap 158 (e.g., at the base of flap 158 or at the midpoint along the length of flap 158). In this manner, joint 160 may increase or decrease first seal 150's responsiveness to pressure differentials. For example, placing a hinge made of soft material at the base of flap 158 may cause first seal 150 to open at a lower threshold pressure differential between air 114 outside nacelle 110 and air 126 inside nacelle 110. In certain embodiments, joint 160 may comprise a rheological material whose stiffness may be configured by a control signal (see, e.g., those rheological materials described above with respect to FIG. 1C). For example, first seal 150 may be closed at a certain pressure differential, and application of an electrical signal may cause joint 160 to soften such that first seal 150 opens, permitting air 114 flow into interior 122 of nacelle 110. In certain embodiments, joint 160 may modify stiffness or structure of flap 158 in response to a controlling mechanism, such as those described above with respect to FIG. 1C. For example, a switch may move a hinge in flap 158 from one state to another, causing flap 158 to lift away from second seal 154 and permit greater air flow.

As an example embodiment of operation of FIGS. 1A-1E, aerial vehicle 105 may be flying at a certain speed. The speed of flight may define the flow of air 114 on front face 113 of engine 111. The heat dissipation needs of certain systems (e.g. electronics or communications systems) on aerial vehicle 105 may define an amount of air 114 needed at heat exchanger 140. First seal 150 may be configured accordingly to vary the amount of air 114 flowing into interior 122 of nacelle 110. The configuration of first seal 150 may be based not only on the heat dissipation needs of systems on aerial vehicle 105, but also on environmental conditions. For example, the amount of air 114 allowed into nacelle 110 may be determined based on the temperature of air 114 outside nacelle 110 and the temperature of fluid 146 within heat exchanger 140. First seal 150 may be opened such that air 114 (part of air 114 incident on front face 113) flows into nacelle 110. For example, first seal 150 may open based on a pressure differential between air inside nacelle 110 and air outside nacelle 110. As another example, first seal 150 may open partially when a control signal sent to joint 160 reduces the stiffness of flap 158, causing flap 158 to pull away from second seal 154. The flow of air 126 through heat exchanger 140 may facilitate heat dissipation according to the needs of systems on aerial vehicle 105.

FIG. 2A is a diagram that illustrates a front view of the example nacelle system 108 of FIG. 1B, according to certain embodiments. FIG. 2B is a diagram that illustrates a section view along lines 2B-2B of the example nacelle system 108 of FIG. 1B, according to certain embodiments. FIGS. 2A-2B illustrate nacelle 110, exterior housing 112, engine 111, heat exchanger 140, and first seal 150.

In certain embodiments, heat exchanger 140 may be disposed around the perimeter of engine 111 inside nacelle 110. In some embodiments, heat exchanger 140 may be in the shape of an annulus around engine 111. For example, the cross-section of heat exchanger 140 may be a circular or elliptical annulus. In some embodiments, heat exchanger 140 does not completely encircle engine 111 within nacelle 110. For example, heat exchanger 140 may generally be annular but have one or more cut-out sections such that heat exchanger 140 is disposed only partially around engine 111. The cut-out sections may be provided to make room for other elements within nacelle 110 or for mounting heat exchanger 140.

In certain embodiments, first seal 150 or second seal 154 may be disposed around the perimeter of engine 111 between nacelle 110 and engine 111. In some embodiments, first seal 150 or second seal 154 may be in the shape of an annulus around engine 111. For example, the cross-section of first seal 150 (e.g., that shown in FIG. 2B) or second seal 154 may be a circular or elliptical annulus. In some embodiments, first seal 150 or second seal 154 does not completely encircle engine 111. For example, first seal 150 or second seal 154 may generally be annular but have one or more cut-out sections, such that first seal 150 or second seal 154 is disposed only partially around engine 111. The cut-out sections may be provided to make room for other elements between nacelle 110 and engine 111 or for mounting first seal 150 or second seal 154.

FIG. 3A is a diagram that illustrates a perspective view of a portion of an example variable seal 300 of a first type, according to certain embodiments. Variable seal 300 may be configured to vary the amount of air 114 allowed into interior 122 of nacelle 110 in an embodiment. Variable seal 300 includes first seal 150, perforated cover 305, and perforations 320 in an embodiment.

Perforated cover 305 may be a cover, screen, seal, or overlay for varying the amount of air allowed into nacelle 110. As explained above, inlet apertures 156 may allow air 114 into nacelle 110. Perforated cover 305 may vary the amount of air 114 allowed into interior 122 of nacelle 110 by, for example, adjusting the overlap between perforations 320 in perforated cover 305 and inlet apertures 156 in first seal 150. For instance, a complete overlap between perforations 320 in perforated cover 305 and inlet apertures 156 in first seal 150 allows the maximum possible air 114 to pass through inlet apertures 156 into interior 122 of nacelle 110. However, perforated cover 305 may be adjusted so that perforations 320 only overlap half of inlet apertures 156 and perforated cover 305 covers the remaining half of inlet apertures 156, thereby blocking half of the air 114 flowing into nacelle 110. Perforated cover 305 may be configured to vary the amount of air allowed into the interior of the nacelle automatically, based on environmental conditions, or manually, based on input from a user. For example, a computer may send a control signal to position perforated cover 305 to allow air 126 into interior 122 of nacelle 110, but user input may override the control signal and position perforated cover 305 to close variable seal 300. Perforated cover 305 may be slidably engaged with first seal 150. For example, perforated cover 305 may be automatically (e.g., mechanically) adjusted (e.g., rotated) to change the overlap between perforations 320 and inlet apertures 156. Perforated cover 305 may be made from any suitable material. As particular examples, perforated cover 305 may be made from metal (e.g., titanium, steel, aluminum), elastomer, or plastic, or any other suitable material or any suitable combination of materials. The materials for perforated cover 305 may be chosen to reduce friction between perforated cover 305 and first seal 150, protect perforated cover 305 and first seal 150 from environmental exposure, and maintain a long lifetime for perforated cover 305 and first seal 150. As perforated cover 305 may be slidably engaged with first seal 150, movement of perforated cover 305 (e.g., rotation in FIG. 3A) may place variable seal 300 in any number of configurations. The position of perforated cover 305 may define an overlap between perforations 320 and inlet apertures 156. FIGS. 3B and 3C illustrate two example configurations of variable seal 300. Perforated cover 305 includes one or more perforations 320 that permit air 114 flow through perforated cover 305.

Perforations 320 may be any hole, gap, aperture, passage, or any other type of opening through which air may pass. Perforations 320 may be any suitable size, shape, number, and spacing for configuring variable seal 300 to control the amount of air 114 allowed into nacelle 110. In certain embodiments, the size, shape, number, and spacing of perforations 320 may differ from the size, shape, number, and spacing of inlet apertures 156. Perforations 320 may also have the same size, shape, number, and spacing as inlet apertures 156. In certain embodiments, not all perforations 320 may have the same size or shape as each other.

FIG. 3B is a diagram that illustrates a section view along lines 3B-3B of a portion of the example variable seal 300 of FIG. 3A in a first position, according to certain embodiments. As shown in the example of FIG. 3B, perforated cover 305 may be positioned such that perforations 320 do not overlap inlet apertures 156. Due to the lack of overlap between perforations 320 and inlet apertures 156, first seal 150 may block any air 114 that would flow through perforations 320. In this first configuration, variable seal 300 may be closed and allow no air 114 into interior 122 of nacelle 110. In certain embodiments, a variable seal 300 may remain closed regardless of environmental conditions. For example, variable seal 300 may permit no air 114 into nacelle 110 regardless of the pressure differential between air 114 outside nacelle 110 and air 126 inside nacelle 110.

FIG. 3C is a diagram that illustrates a section view along lines 3B-3B of a portion the example variable seal 300 of FIG. 3A in a second position, according to certain embodiments. As shown in the example of FIG. 3C, perforated cover 305 may be positioned such that perforations 320 include some overlap with inlet apertures 156. The position of perforated cover 305 may define one or more overlaps 330 between perforations 320 and inlet apertures 156. Overlaps 330 may be any size, shape, number, and spacing permitted by the sizes, shapes, number, and spacing of perforations 320 and inlet apertures 156. Although the size, shape, spacing, and number of perforations 320 and inlet apertures 156 are approximately the same in FIGS. 3A-3C, perforations 320 and inlet apertures 156 may have different size, shape, spacing, and number in certain embodiments. The size, shape, spacing, and number of perforations 320 and inlet apertures 156 may result in not all overlaps 330 having the same size or shape.

As shown in FIG. 3C, variable seal 300 may allow air 114 to flow through one or more overlaps 330 into interior 122 of nacelle 110. As the position of perforated cover 305 may result in overlaps 330 of varying size, variable seal 300 may be fully closed (no overlap), fully open (maximum overlap), or partially open (partial overlap). In certain embodiments, variable seal 300 may not allow air 114 into nacelle 110 even when configured for maximum overlap. For example, flap 158 of first seal 150 may remain in contact with second seal 154, despite configuring variable seal 300 for maximum overlap, because the pressure differential between air outside nacelle 110 and air inside nacelle 110 does not exceed a threshold pressure differential. In certain embodiments, flap 158 of first seal 150 may be removed such that overlaps 330 define the amount of air 114 flowing into nacelle 110. Accordingly, the overlap or non-overlap between inlet apertures 156 and perforations 320 may be used to vary the amount of air 114 allowed into interior 122 of nacelle 110. Increasing the overlap between inlet apertures 156 and perforations 320 may increase an amount of air 114 allowed into nacelle 110, while decreasing the overlap may reduce the amount of air 114 allowed into nacelle 110.

Perforated cover 305 may be configured to vary the amount of air 114 allowed into interior 122 of nacelle 110 based on environmental conditions (e.g., the environmental conditions discussed above). For example, variable seal 300 may be partially opened when aerial vehicle 105 is flying at high-speed in cold weather. As additional examples, variable seal 300 may be configured to close fully in dusty conditions and open fully when aerial vehicle 105 is taxiing at low speed. Variable seal 300 may advantageously permit greater responsiveness to environmental conditions and greater precision in determining the amount of air 114 allowed into nacelle 110.

Perforated cover 305 may be configured to vary the amount of air 114 allowed into interior 122 of nacelle 110 based on input from a user. For example, a controlling mechanism (e.g., as described above with respect to FIG. 1C) may adjust the overlap between inlet apertures 156 and perforations 320 in response to user input by, for example, causing rotation of perforated cover 305. For example, a motor may move perforated cover 305 from the position shown in FIG. 3B to the position shown in FIG. 3C in response to a control signal received from a computer. Embodiments illustrated in FIGS. 3A-3C and other embodiments (e.g., those discussed above with reference to FIG. 1D-1E, or those discussed below with reference to FIG. 4A-4B) may jointly vary the amount of air 114 allowed into nacelle 110.

Although perforated cover 305 is shown in FIGS. 3A-3C below first seal 150 (inside the diameter of first seal 150), perforated cover 305 may also be located on the other side of first seal 150, such that perforations 320 are located above inlet apertures 156 in FIGS. 3B-3C. Environmental and maintenance considerations may inform whether to place perforated cover 305 above or below first seal 150. For example, placement of perforated seal 305 below first seal 150 (as shown in FIGS. 3A-3C) may ease maintenance (as perforated cover 305 is more accessible) while increasing exposure of perforated cover 305 to the environment. Other design considerations (e.g., the space available inside nacelle 110, or available mounting locations) may also inform the placement of perforated cover 305 above or below first seal 150.

Overlaps 330 may be one or more areas of overlap between inlet apertures 156 and perforations 320. Overlaps 330 may be anywhere from 0% overlap between those components and 100% overlap between those components (e.g., 100% overlap between perforations 320 and inlet apertures 156). As explained above, increasing the amount of overlap 330 (e.g., increasing from 40% overlap to 50% overlap) between perforations 320 and apertures 156 may increase the amount of air 114 allowed into nacelle 110. Decreasing the amount of overlap 330 between perforations 320 and apertures 156 may decrease the amount of air 114 allowed into nacelle 110.

Embodiments discussed with reference to FIGS. 3A-3C may have certain additional advantages. Selection of appropriate materials for perforated cover 305 and first seal 150 may minimize friction and material wear. In certain embodiments, the controlling mechanism that positions perforated cover 305 may be implemented with less complexity (e.g., with motor control rather than rheological materials). Configuring variable seal 300 by moving perforated cover 305 may ease implementation and improve reliability relative to other configuration methods. For example, movement of perforated cover 305 may be implemented with a motor in a reliable manner. Perforated cover 305 may also ease maintenance and extend the lifetime of variable seal 300. For example, exposing perforated cover 305 to the environment permits it to be swapped out easily while also protecting first seal 150 from the environment.

FIG. 4A is a diagram that illustrates a perspective view of a portion of an example variable seal 400 of a second type according to certain embodiments, while FIG. 4B is a diagram that illustrates a section view along lines 4B-4B of the example variable seal 400 of FIG. 4A. The components and operation of variable seal 400 are described below with reference to both figures. Variable seal 400 may vary an amount of air 114 allowed into nacelle 110 in an embodiment. Variable seal 400 includes first seal 150 and inlet apertures 156 (both as described above), and ring 410 in an embodiment.

Ring 410 may be a ring, band, hoop, loop, or a portion of a ring, band, hoop, or loop. Ring 410 may be configured to vary an amount of air 114 allowed through first seal 150. For instance, ring 410 may be adjusted to increase or decrease ring 410's diameter, thereby increasing or decreasing the amount of air 114 allowed through first seal 150. Ring 410 may be coupled to first seal 150. Ring 410 may be located anywhere along the length of flap 158 (e.g., at the midpoint or tip of flap 158). Ring 410 may be made from any suitable material. As particular examples, ring 410 may be made from metal (e.g., titanium, aluminum, steel), elastomer, or plastic, or any other suitable material or any suitable combination of materials. In certain embodiments, ring 410 may comprise a rheological material, such as those described above with respect to FIGS. 1C-1E. Where variable seal 400 is shaped as an annulus, ring 410 may also be shaped as an annulus or appear only in certain regions of the annular shape of variable seal 400.

Variable seal 400 may allow air 114 into interior 122 of nacelle 110 based on the diameter of ring 410. In certain embodiments, a larger diameter of ring 410 corresponds to increased air flow (at least partially opening variable seal 400), and a smaller diameter of ring 410 corresponds to decreased air flow (at least partially closing variable seal 400). In certain embodiments, the diameter of ring 410 may define how responsive flap 158 is to environmental conditions. For example, variable seal 400 may be partially open, allowing air flow, at a given pressure differential (between air 114 outside nacelle 110 and air 126 inside nacelle 110), and increasing the diameter of ring 410 may cause variable seal 400 to open further, increasing air flow at the given pressure differential.

The diameter of ring 410 may be adjusted in response to an electrical, magnetic, or thermal control signal. For example, the diameter of ring 410 comprising rheological material may increase in response to an electrical control signal, lifting flap 158 of first seal 150 away from second seal 154 and allowing air 114 into interior 122 of nacelle 110. In certain embodiments, the diameter of ring 410 may be adjusted with a controlling mechanism, such as those discussed above with reference to FIG. 1C. For example, one or more motors may move sections of ring 410, present in parts of first seal 150, to one or more diameters. As another example, ring 410 may include a hollow tube or hose containing a cable, such that insertion of more or less cable into the tube or hose causes the diameter of ring 410 to increase or decrease. Embodiments illustrated in FIG. 4 and other embodiments (e.g., those discussed above with reference to FIGS. 1C-1E and FIGS. 3A-3C) may jointly vary the amount of air 114 allowed into nacelle 110.

The configuration of variable seal 400 may be based on environmental conditions (e.g., the environmental conditions described above). For example, when aerial vehicle 105 is taxiing at low speed, the diameter of ring 410 may increase to open variable seal 400 and increase air flow. As another example, the diameter of ring 410 may decrease to close variable seal 400 and prevent dust from entering nacelle 110. Variable seal 400 may advantageously permit greater responsiveness to environmental conditions in determining the amount of air 114 allowed into nacelle 110.

Embodiments discussed with reference to FIGS. 4A-4B may have certain additional advantages. Variable seal 400 may weigh less than alternate embodiments. Configuring variable seal 400 with ring 410 may simplify installation and maintenance of variable seal 400 by requiring installation or replacement of a single part rather than multiple parts. Configuration of variable seal 400 may also be less susceptible to impairment from icing, as ring 410 may be located off the main engine air flow path. And implementation of ring 410 with rheological materials may enable configuration of variable seal 400 with electrical control signals rather than mechanical actuation.

FIG. 5 illustrates an example method 500 for varying air flow. Method 500 may be performed with respect to either variable seal 300 or variable seal 400. Method 500 begins in step 510 where a computer monitors an actual position of perforated cover 305. As discussed above, perforated cover 305 may be slidably engaged with first seal 150 and configured to vary an amount of air 114 allowed into interior 122 of nacelle 110. In certain embodiments, the computer may receive data relating to the actual position of the perforated cover from one or more sensors. Sensors may include, for example, optical, infrared, electromagnetic, ultrasonic, capacitive, inductive, eddy-current, hall-effect, or grating sensors.

In certain embodiments, a computer may monitor one or more actual overlaps between perforations 320 in perforated cover 305 and inlet apertures 156 in first seal 150. For instance, a computer may monitor an extent of overlap (including no overlap at all) between perforations 320 and inlet apertures 156. In certain embodiments, a computer may monitor actual air flow into nacelle 110. In certain embodiments, a computer may monitor air pressure or a pressure differential. The computer may receive data relating to overlap, air flow, pressure, or a pressure differential from one or more sensors. For example, the computer may receive air flow data from a mass flow or ram-air sensor.

In step 520, the computer determines overlap (including no overlap at all) between one or more perforations 320 in perforated cover 305 and one or more inlet apertures 156 in first seal 150. The computer may determine the overlap based on a database. The database may include data associated with one or more environmental conditions (e.g., the environmental conditions described above). Environmental conditions may relate to functionality or performance of aerial vehicle 105 or remote systems. For example, environmental conditions may include the temperature of one or more remote systems (e.g., electronics or communication systems). In certain embodiments, environmental conditions may include conditions external to aerial vehicle 105 or remote systems (e.g., those conditions discussed with reference to FIG. 1C).

In certain embodiments, the database may be updated based on input from a user. For example, user input may indicate that engine 111 is on fire, such that variable seal 300 or variable seal 400 should be configured to remain shut, regardless of other environmental conditions, until the fire is extinguished.

In certain embodiments, the computer may determine an overlap based on a required air flow. For example, the computer may determine that remote systems require additional heat dissipation, determine the amount of air flow required to provide that heat dissipation, and determine an overlap required to provide the required air flow into nacelle 110. In certain embodiments, the computer may determine an overlap based on the required configuration of variable seal 300 or variable seal 400. For example, the computer may determine that no overlap is required (e.g., variable seal 300 closed) to prevent dust from entering nacelle 110. As another example, the computer may determine that maximum overlap is required (e.g., variable seal 300 open) when aerial vehicle 105 is taxiing at low speed. In certain embodiments, the computer may determine an overlap based on an actual configuration of variable seal 300 or variable seal 400. For example, in an embodiment where ring 410 is used with perforated cover 305, the computer may determine that no overlap is required because ring 410 has pulled flap 158 into contact with second seal 154 (e.g., variable seal 300 closed) and permitting air flow through perforated cover 305 would unnecessarily expose first seal 150 and second seal 154 to the environment.

In step 530, the computer determines a new position of perforated cover 305. As discussed above with reference to FIGS. 3A-3C, the new position of the perforated cover defines a new overlap between one or more perforations 320 and one or more inlet apertures 156. The computer may determine the new position of perforated cover 305 required to define the overlap determined in step 520. For example, based on an amount of dust in the environment (as indicated by the database), the computer may determine the required position of perforated cover 305 such that no overlap exists.

In an embodiment using variable seal 400, the computer may perform additional steps as well as those illustrated in FIG. 5. The computer may monitor the actual diameter of ring 410 or the actual gap between flap 158 and second seal 154. As discussed above with respect to FIG. 4, the diameter of ring 410 may define a gap between flap 158 and second seal 154. In certain embodiments, the computer may receive data relating to the actual position of ring 410 or flap 158, or the actual size of the gap between flap 158 and second seal 154, from one or more sensors.

In certain embodiments, the computer may determine the required diameter of ring 410 or a required gap between flap 158 and second seal 154. The computer may determine the required ring 410 diameter or gap based on a database. The database may include data associated with one or more environmental conditions, such as those discussed above with respect to step 520. In an embodiment, the computer may determine the required ring 410 diameter or gap between flap 158 and second seal 154 based on a required air flow or a required configuration of variable seal 400 (e.g., open or closed). The computer may determine a required ring 410 diameter or gap based on an actual configuration of variable seal 400. For example, the computer may determine that the configuration of ring 410 should not change because perforated cover 305 is configured to block air flow into nacelle 110, such that no air flow would enter nacelle 110 even if the diameter of ring 410 changed.

In certain embodiments, the computer may send a control signal to variable seal 300 or variable seal 400. In certain embodiments, the computer may send a control signal to joint 160, perforated cover 305, or ring 410. For example, ring 410 comprising rheological material may increase its diameter, opening variable seal 300 or 400, in response to an electrical control signal received from the computer.

In certain embodiments, the computer may send a control signal to a controlling mechanism (e.g., those discussed above with respect to FIG. 1C) that configures variable seal 300 or 400 in response to the control signal. The computer may define the position of perforated cover 305, ring 410, or joint 160 by sending a control signal to a controlling mechanism. For example, a motor may rotate perforated cover 305 to a position, defining a required overlap, in response to an electrical control signal sent by the computer.

FIG. 6 is a schematic diagram illustrating an example computer system 600, according to certain embodiments. In certain embodiments, computer system 600 implementing certain steps of method 500 may comprise one or more computer systems 600. In certain embodiments, one or more computer systems 600 provide certain functionality described or illustrated herein. In certain embodiments, software running on one or more computer systems 600 performs one or more steps of one or more methods described or illustrated herein or provides functionality described or illustrated herein. Certain embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer systems 600 taking any suitable physical form. As example and not by way of limitation, computer systems 600 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer systems 600 may be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In certain embodiments, computer systems 600 may include a processor 602, memory 604, storage 606, an input/output (I/O) interface 608, a communication interface 610, and a bus 612. This disclosure contemplates any suitable computer system having any suitable number of any suitable components in any suitable arrangement.

In certain embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In certain embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In certain embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processor 602. This disclosure contemplates any suitable processor.

In certain embodiments, memory 604 includes main memory for storing instructions for processor 602 to execute or data for processor 602 to operate on. As an example and not by way of limitation, computer systems 600 may load instructions from storage 606 or another source (such as, for example, another computer system) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In certain embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. A bus 612 may include one or more memory buses, as described below. In certain embodiments, one or more memory management units (MMUs) reside between processor 602 and memory 604 and facilitate accesses to memory 604 requested by processor 602. In certain embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. This disclosure contemplates any suitable memory.

In certain embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer systems 600, where appropriate. In certain embodiments, storage 606 may be non-volatile, solid-state memory. In certain embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. This disclosure contemplates any suitable storage.

In certain embodiments, I/O interface 608 includes hardware, software, or both, providing one or more interfaces for communication between computer systems 600 and one or more I/O devices. Computer systems 600 may include one or more of these I/O devices, where appropriate. One or more of these I/O devices may enable communication between a person and computer systems 600. As an example and not by way of limitation, I/O interface 608 may include a keyboard, keypad, microphone, monitor, mouse, printer, scanner, speaker, still camera, stylus, tablet, touch screen, trackball, video camera, another suitable I/O device or a combination of two or more of these. I/O interface 608 may include one or more sensors. This disclosure contemplates any suitable I/O devices and any suitable I/O interfaces for them. Where appropriate, I/O interface 608 may include one or more device or software drivers enabling a processor to drive one or more of these I/O devices. I/O interface 608 may include one or more I/O interfaces 608, where appropriate. This disclosure contemplates any suitable I/O interface.

In certain embodiments, a communication interface 610 includes hardware, software, or both providing one or more interfaces for communication (such as, for example, packet-based communication) between computer systems 600 and one or more other computer systems or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface for it. As an example and not by way of limitation, computer systems 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer systems 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long Term Evolution (LTE) network, or a 5G network), or other suitable wireless network or a combination of two or more of these. Computer systems 600 may include any suitable communication interface 610 for any of these networks, where appropriate. Communication interface 610 may include one or more communication interfaces 610, where appropriate. This disclosure contemplates any suitable communication interface.

In certain embodiments, a bus 612 includes hardware, software, or both coupling components of computer systems 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. This disclosure contemplates any suitable bus or interconnect.

The components of computer systems 600 may be integrated or separated. In some embodiments, components of computer system 600 may each be housed within a single chassis. The operations of computer systems 600 may be performed by more, fewer, or other components. Additionally, operations of computer systems 600 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
   monitoring, by a computer, an actual position of a perforated cover, wherein the perforated cover comprises a plurality of perforations and is slidably engaged with a first seal, the first seal being proximate to an opening into an interior of a nacelle, the nacelle configured to at least partially surround an aircraft engine, the first seal comprising a plurality of inlet apertures, the perforated cover being configured to vary an amount of air allowed into the interior of the nacelle based on an adjustment of an amount of overlap between the plurality of perforations in the perforated cover and the plurality of inlet apertures in the first seal;
   determining, by the computer, the overlap between the plurality of perforations in the perforated cover and the plurality of inlet apertures in the first seal; and
   determining, by the computer, a new position of the perforated cover, wherein the new position of the perforated cover defines a new overlap between the plurality of perforations and the plurality of inlet apertures.

2. The method of claim 1, further comprising updating a database based on input from a user.

3. The method of claim 1, wherein determining the new position of the perforated cover comprises determining the new position of the perforated cover based on environmental conditions, wherein the environmental conditions include one or more of: a flight speed of an aerial vehicle; a temperature of air in the interior of the nacelle; a temperature of air outside the nacelle; a temperature of a fluid flowing within a heat exchanger; a temperature of one or more remote systems from which the heat exchanger is removing heat; a pressure differential between air outside the nacelle at the opening and air inside the nacelle; an amount of moisture in air outside the nacelle; and an amount of dust in air outside the nacelle.

4. The method of claim 3, wherein the new position of the perforated cover is determined based on the amount of dust in air outside the nacelle such that the plurality of perforations in the perforated cover do not overlap with the plurality of inlet apertures in the first seal.

5. The method of claim 1, wherein the plurality of perforations in the perforated cover are a same size and shape as the plurality of inlet apertures in the first seal.

6. An apparatus, comprising:
a nacelle configured to at least partially surround an aircraft engine;
a first seal, proximate to an opening into an interior of the nacelle, wherein the first seal comprises a plurality of inlet apertures; and
a perforated cover, wherein:
the perforated cover comprises a plurality of perforations;
the perforated cover is slidably engaged with the first seal; and
the perforated cover is configured to vary an amount of air allowed into the interior of the nacelle based on an adjustment of an amount of overlap between the plurality of perforations in the perforated cover and the plurality of inlet apertures in the first seal.

7. The apparatus of claim 6, wherein the first seal is configured to allow air into the interior of the nacelle when exposed to a pressure differential above a threshold pressure differential between air outside the nacelle at the opening and air inside the nacelle.

8. The apparatus of claim 6, wherein the perforated cover is configured to vary the amount of air allowed into the interior of the nacelle based on input from a user.

9. The apparatus of claim 6, wherein the perforated cover is configured to vary the amount of air allowed into the interior of the nacelle based on environmental conditions.

10. The apparatus of claim 6, wherein the plurality of perforations are a same size and shape as the plurality of inlet apertures.

11. The apparatus of claim 6, further comprising a ring, coupled to the first seal, configured to vary an amount of air allowed through the first seal.

12. The apparatus of claim 11, wherein the first seal is configured to vary an amount of air allowed into the interior of the nacelle based on a diameter of the ring.

13. The apparatus of claim 11, wherein the first seal comprises one or more joints.

14. A system, comprising:
a nacelle, wherein the nacelle comprises:
an exterior housing configured to at least partially surround an aircraft engine; and
a front portion comprising an opening into an interior of the nacelle;
a first seal, proximate to the opening of the nacelle, wherein the first seal comprises a plurality of inlet apertures configured to allow air to a heat exchanger; and
a perforated cover, wherein:
the perforated cover comprises a plurality of perforations;
the perforated cover is slidably engaged with the first seal; and
the perforated cover is configured to vary an amount of air allowed into the interior of the nacelle based on an adjustment of an amount of overlap between the plurality of perforations in the perforated cover and the plurality of inlet apertures in the first seal.

15. The system of claim 14, wherein the heat exchanger is configured to be located inside the nacelle, the heat exchanger configured to exchange heat between a fluid flowing within the heat exchanger and air in the interior of the nacelle.

16. The system of claim 14, wherein the first seal is configured to allow air into the interior of the nacelle when exposed to a pressure differential above a threshold pressure differential between air outside the nacelle at the opening and air inside the nacelle.

17. The system of claim 14, wherein the perforated cover is configured to vary the amount of air allowed into the interior of the nacelle based on input from a user.

18. The system of claim 14, wherein the perforated cover is configured to vary the amount of air into the interior of the nacelle based on environmental conditions.

19. The system of claim 18, wherein the environmental conditions include one or more of:
a flight speed of an aerial vehicle;
a temperature of air in the interior of the nacelle;
a temperature of air outside the nacelle;
a temperature of a fluid flowing within the heat exchanger;
a temperature of one or more remote systems from which the heat exchanger is removing heat;
a pressure differential between air outside the nacelle at the opening and air inside the nacelle;
an amount of moisture in the air outside the nacelle; and
an amount of dust in the air outside the nacelle.

20. The system of claim 14, wherein the plurality of perforations are a same size and shape as the plurality of inlet apertures.

* * * * *